April 15 1947.   I. T. QUARNSTROM   2,419,089
MOLD BASE
Filed June 9, 1944

INVENTOR.
IVAR T. QUARNSTROM.
BY Robert A Sloman
ATTORNEY.

Patented Apr. 15, 1947

2,419,089

UNITED STATES PATENT OFFICE 2,419,089

MOLD BASE

Ivar T. Quarnstrom, Detroit, Mich.

Application June 9, 1944, Serial No. 539,516

8 Claims. (Cl. 18—42)

This invention relates to a standard mold base for injection plastic molding, and has for its principal object the elimination of dowel and leader pins where possible for providing a simplified structure.

It is the further object herein to eliminate the ejector plate push back pins heretofore provisioned centrally within the mold, and substitute combination leader and push back pins which also act as guides for ejector plate movements.

It is the further object herein to provide bushings for said combination push back pins which also function as dowels in maintaining an immovable relation between the rear cavity plate and its supporting back up plate.

It is the further object herein to eliminate protruding dowel pins from the rear cavity plate. Maximum working area is made possible by placing the combination push back and leader pins directly under the front cavity plate leader pins.

Other objects will be seen from the following specification and claims disclosing the various elements of the invention and their combinations as illustrated in the accompanying drawing of which—

Figure 2:
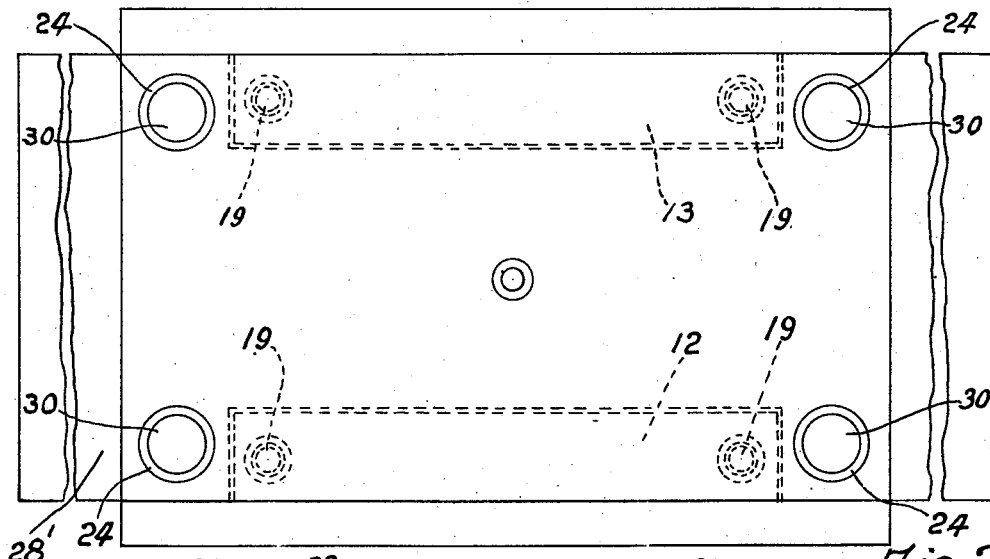
Figure 1:
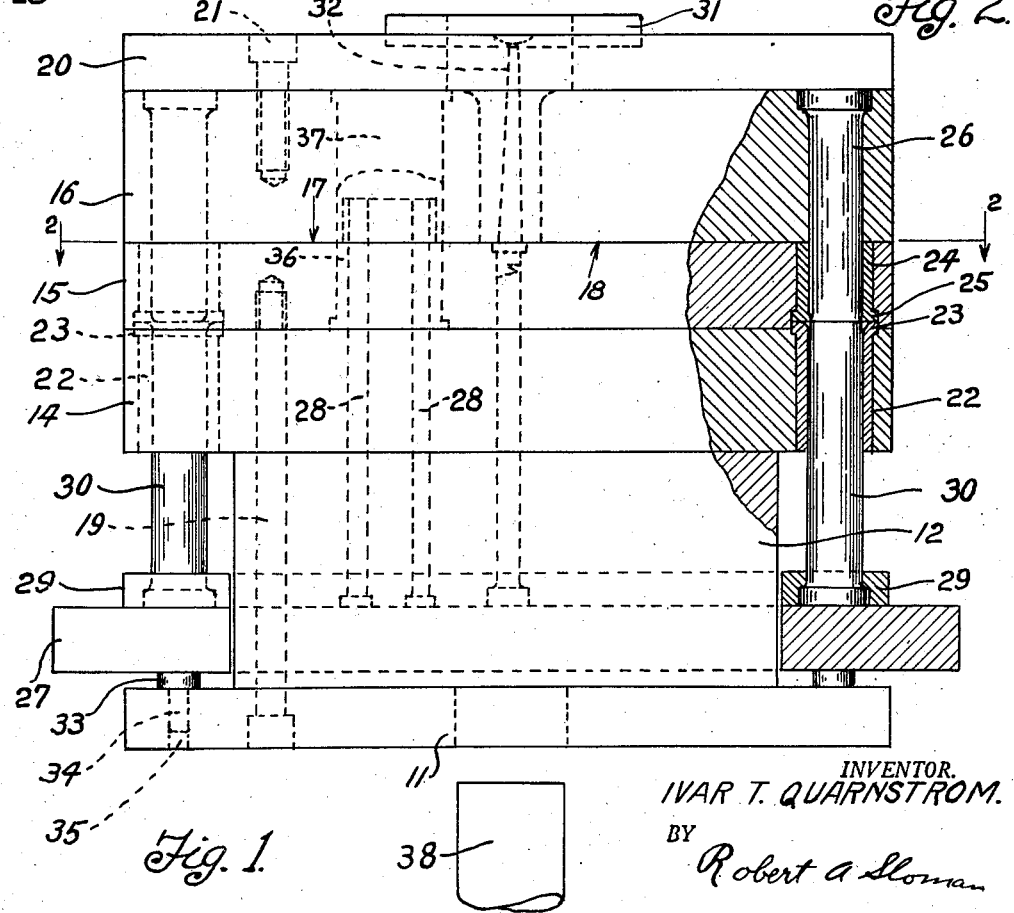

Fig. 1 is a broken away partially sectioned elevational view of the mold base; and Fig. 2 is a plan view thereof with members 16 and 20 removed.

It will be understood that the said drawing illustrates merely a preferable embodiment of the invention, and that other embodiments are contemplated within the scope of the claims hereunder set out.

In the drawing, Fig. 1 shows the standard mold base having a rectangular anchor plate 11 with two upright parallel members 12 and 13 disposed and secured thereon in spaced relation as shown in detail in Fig. 2. Anchor plate 11 is adapted to be secured to and reciprocably carried by the movable member of a conventional molding machine.

A back up plate 14 rectangular in shape is positioned upon the top edges of members 12 and 13 providing means for supporting the removable and interchangeable rear cavity retainer plate 15. A corresponding front cavity retainer plate 16 is provided similar in shape to said rear cavity plate for compressive cooperative engagement with respect thereto. Both the upper surface 17 of retainer plate 15 and the lower surface 18 of retainer plate 16 are initially blank, but are adapted to have impressed or cut therein, or inserted therein, corresponding and mating cores and molds 36 and 37 respectively within which is injected a plastic material to be molded therein.

Members 11, 12, 14 and 15 are all firmly secured together by screws 19 provisioned through members 11, 12 and 14 and threaded into rear cavity plate 15. Also members 11, 13, 14 and 15 are secured together by similar screws 19 provisioned through members 11, 13 and 14 and threaded into rear cavity plate 15, whereby a single compact movable unit is formed.

On the other hand stationary anchor plate 20 adapted to be supported within the stationary part of a molding machine, has provisioned thereunder front cavity retainer plate 16 immovably retained by screws 21. Thus the stationary molding unit is provided with respect to which the first described molding unit is reciprocably movable.

It will be noted that the four screws 19 are axially aligned with the four screws 21 positioned as shown in Fig. 2.

The four spaced bushings 22 are provisioned through back up plate 14 with their annular flanged upper portions 23 extending partially above said plate. Flanged portions 23 extend up into and are securely nested within corresponding openings in the rear cavity retainer plate 15 whereby an immovable relationship is established between back up plate 14 and rear cavity retainer plate 15.

Corresponding bushings 24 are oppositely provisioned within rear cavity retainer plate 15 with their openings aligned with the openings of bushings 22. The annularly flanged portions 25 of bushings 24 are in engagement with flanged portions 23 of bushings 22 as shown in Fig. 1.

Four leader pins 26 retained within front cavity plate 16 extend downwardly therefrom for sliding engagement within corresponding bushings 24 when the cavity plate 15 is projected into engagement with the stationary cavity plate 16 for the molding operation.

Said leader pins function to obtain proper alignment between said cavity plates and the molds provisioned therein. Ejector plate 27 with its ends outwardly flanged at 28' is longitudinally disposed between parallel members 12 and 13 and is adapted for relative reciprocable movement between anchor plate 11 and back up plate 14. Ejector pins 28 attached to ejector plate 27 extend upwardly therefrom and through back up plate 14 and also into openings within mold core 36 provisioned within cavity plate 15. A corresponding mold 37 is oppositely provisioned within cavity plate 16 for cooperation with core 36 in forming the molded member.

Plate 29 secured upon ejector plate 27 retains and secures in upright position combination push back and leader pins 30. With ejector plate 27 inoperative said pins are slidingly and guidingly provisioned within bushings 22.

After the molding operation rear cavity plate 15 is withdrawn by operation of the molding machine. Ejector plate is withdrawn only partially and then is stopped from further movement by stationary bar 38 extending from the molding machine and loosely through anchor plate 11. Movement of cavity plate 15 and back up plate 14 relative to said retained ejector plate and ejector pins 28 is guided by leader pins 30 within bushings 22 and 24.

By operation of the molding machine and in anticipation of the next molding operation, the rear cavity plate 15, as well as members 14, 13, 12 and 11, are projected towards front cavity plate 16 so that initially the push back pins 30 are operatively engaged by the ends of leader pins 26. Further movement of cavity plate 15 up to engagement with cavity plate 16 thus effects relative return of push back pins 30 and ejector plate 27 to their initial inoperative positions.

Thus push back pins perform the additional function of leader pins relatively to the members 15 and 14 heretofore employed separately.

In operation in carrying out injection molding, the cavity retainer plate 15 is brought tightly into cooperative engagement with the stationary cavity retainer plate 16, and a plastic molding material is injected through locator 31 and nozzle 32 indicated in Fig. 1.

It will be noted that ejector plate 27 is initially maintained adjacent but in spaced relation to anchor plate 11 by means of studs 33 with their central projections 34 being seated in corresponding openings 35 in anchor plate 11.

Having described my invention reference should now be had to the claims which follow for determining the scope thereof.

I claim:

1. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of upright push-back pins extending from said ejector plate through said back up plate and into said rear cavity plate for relative reciprocal sliding engagement within corresponding openings in said back-up plate and rear cavity plate, and a plurality of aligned oppositely disposed leader pins depending from said front cavity plate and extending into said rear cavity plate for relative reciprocal engagement within the same openings in said rear cavity plate and of such length that they operatively abut said push-back pins when the mold is closed to return said ejector plate to its inoperative position.

2. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of aligned bushings projecting into said back-up plate and said rear cavity plate, a plurality of upright push-back pins extending from said ejector plate through said back-up plate and into said rear cavity plate for relative reciprocal sliding engagement within said bushings, and a plurality of aligned oppositely disposed leader pins depending from said front cavity plate and extending into said rear cavity plate for reciprocal engagement within said bushings, and of such length that they operatively abut said push-back pins when the mold is closed to return said ejector plate to its inoperative position.

3. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of bushings projecting through said back-up plate and extending partially into said rear cavity plate, a plurality of aligned bushings within said rear cavity plate, a plurality of upright push-back pins extending from said ejector plate through said back-up plate and into said rear cavity plate for relative reciprocal sliding engagement within said bushings, and a plurality of aligned oppositely disposed leader pins depending from said front cavity plate and extending into said rear cavity plate for relative reciprocal movement within said rear cavity plate bushings, and of such length that they operatively abut said push-back pins when the mold is closed to return said ejector plate to its inoperative position.

4. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of shoulder bushings projecting within said back-up plate with their shoulders extending into said rear cavity plate, for preventing relative transverse movement of said back-up plate and rear cavity plate, a plurality of aligned shoulder bushings within said rear cavity plate, a plurality of upright push-back pins extending from said ejector plate through said back-up plate and into said rear cavity plate for relative reciprocal sliding engagement within said bushings, and a plurality of aligned oppositely disposed leader pins depending from said front cavity plate and extending into said rear cavity plate for relative reciprocal movement therein, and of such length that they operatively abut said push-back pins when the mold is closed to return said ejector plate to its inoperative position.

5. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of upright push-back pins extending from said ejector plate through said back-up plate and into said rear cavity plate for relative reciprocal sliding engagement within corresponding openings in said back-up plate and rear cavity plate, a plurality of aligned oppositely disposed leader pins depending from said front cavity plate extending into said rear cavity plate for relative reciprocal engagement within the same openings in said rear cavity plate, and of such length that they operatively abut said push-back pins when the mold is closed to return said ejector plate to its inoperative position, and a plurality of screws projecting through said reciprocal anchor plate, said parallel members, said back-up plate, and threaded into said rear cavity plate.

6. In a mold base employing front and rear cavity plates, a reciprocal anchor plate providing a support for said rear cavity plate, a stationary anchor plate for supporting said front cavity plate, an ejector plate reciprocally mounted within said reciprocal anchor plate, a plurality of upright ejector plate push-back pins extending from said ejector plate and into said rear cavity plate for relative reciprocal sliding movement therein, and a plurality of aligned oppositely disposed leader pins depending from said front cavity plate and extending into said rear cavity plate for relative reciprocal movement therein, and of such length that they operatively abut said push-back pins when the mold is closed to return said ejector plate to its inoperative position.

7. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of bushings projecting within said back-up plate and extending into said rear cavity plate, for preventing relative transverse movement of said back-up plate and rear cavity plate, a plurality of aligned bushings within said rear cavity plate, a plurality of upright push-back pins extending from said ejector plate through said back-up plate and into said rear cavity plate for relative reciprocal sliding engagement within said bushings, and a plurality of aligned oppositely disposed leader pins depending from said front cavity plate and extending into said rear cavity plate for relative reciprocal movement therein, and of such length that they operatively abut said push-back pins when the mold is closed to return said ejector plate to its inoperative position.

8. In a mold base employing front and rear cavity plates, a reciprocal anchor plate, upright parallel members secured thereon in spaced relation, a back-up plate for said rear cavity plate carried by said parallel members, a stationary anchor plate for supporting said front cavity plate, an ejector plate reciprocally mounted between said parallel members, a plurality of bushings projecting within said back-up plate and extending into said rear cavity plate, for preventing relative transverse movement of said back-up plate and rear cavity plate, a plurality of upright push-back pins extending from said ejector plate through said back-up plate and into said rear cavity plate for relative reciprocal sliding engagement within said bushings, and a plurality of aligned oppositely disposed leader pins depending from said front cavity plate and extending into said rear cavity plate for relative reciprocal movement therein, and of such length that they operatively abut said push-back pins when the mold is closed to return said ejector plate to its inoperative position.

IVAR T. QUARNSTROM.

REFERENCES CITED

The following references are of record in the file of this patent:

UNITED STATES PATENTS

| Number | Name | Date |
|---|---|---|
| 2,047,379 | Matson | July 14, 1936 |
| 2,330,369 | Marsh | Sept. 28, 1943 |
| 2,272,718 | MacLagan et al. | Feb. 10, 1942 |